United States Patent [19]

Mitamura et al.

[11] Patent Number: 4,537,538
[45] Date of Patent: Aug. 27, 1985

[54] APPARATUS FOR WORKING ON TURBINE BLADE MOUNTING GROOVES

[75] Inventors: Sachio Mitamura, Kitaibaraki; Hirotsugu Kuroume, Hitachi, both of Japan

[73] Assignee: Hitachi, Ltd., Tokyo, Japan

[21] Appl. No.: 501,992

[22] Filed: Jun. 7, 1983

[30] Foreign Application Priority Data

Jun. 7, 1982 [JP] Japan .................................. 57-96216

[51] Int. Cl.³ .................................................. B23D 37/14
[52] U.S. Cl. .................................... 409/217; 409/232; 409/268; 409/282
[58] Field of Search ................... 409/59, 60, 262, 268, 409/276, 277, 287, 264, 265, 140, 244, 163, 248, 256, 257, 259, 269, 272, 273, 278, 282, 283; 407/12, 42, 45, 15, 16, 27, 28, 29

[56] References Cited

U.S. PATENT DOCUMENTS

| 2,113,554 | 4/1938 | Johnson | 409/262 |
|---|---|---|---|
| 2,123,777 | 7/1938 | Hart | 409/273 X |
| 3,823,643 | 7/1974 | Feucht et al. | 409/203 X |
| 3,889,573 | 6/1975 | Girardi | 409/262 X |
| 4,038,732 | 8/1977 | Hunkeler | 407/29 |
| 4,041,590 | 8/1977 | Schibrowski | 407/15 |
| 4,294,568 | 10/1981 | Lipowsky et al. | 409/268 X |
| 4,382,731 | 5/1983 | Rigdon | 409/265 X |

FOREIGN PATENT DOCUMENTS 378769 12/1938 Italy ........................................ 409/59

Primary Examiner—William R. Briggs
Assistant Examiner—Glenn L. Webb
Attorney, Agent, or Firm—Antonelli, Terry & Wands

[57] ABSTRACT

An apparatus for machining turbine blades of a radial entry type to form in each blade a groove of a Christmas tree shape for mounting the blade on a turbine rotor including a main spindle, a rotary disk supported on the main spindle, and a plurality of cutters supported on the rotary disk through a cutter holder in positions forming an arc on the surface of the disk. The cutters are located such that those of a configuration suitable for use in giving coarse finishes, those of a configurator suitable for giving middling finishes and those of a configuration suitable for giving final fine finishes are arranged successively in positions forming an arc on the disk. A blade to be machined is supported in a position in which a groove thereof crosses paths of movement of the cutters as the disk is rotated. Thus, the blade can be machined to give fine finishes to the groove.

2 Claims, 9 Drawing Figures

4,537,538

APPARATUS FOR WORKING ON TURBINE BLADE MOUNTING GROOVES

BACKGROUND OF THE INVENTION

This invention relates to apparatus for working on mounting grooves formed at bases of blades of a turbine rotor, and, more particularly, to an apparatus for providing mounting grooves of fine finishes by machining radial entry type blades fitted to the turbine rotor from the radial direction.

Turbine blades rotate at high speed in high temperature atmosphere. In fitting the blades to a turbine rotor shaft, the following process has generally been in use. The blades are each formed at the base with a mounting groove in the form of a Christmas tree, and disks integral with the turbine rotor shaft are each formed at the top with a protrusion of a cross-sectional shape conforming to the mounting groove of each blade. The disks are each cut out in one portion to allow the mounting grooves of the blades to be fitted over the protrusion of the disk through the cutout. The blades thus mounted on the disk are successively moved circumferentially of the disk so that they are securely fitted to the disk in the form of a torus. This process is generally referred to as a radial entry process. In mounting the blades on the disks, it is essential that the mounting grooves of the blades and the protrusion of the disk of the rotor shaft be finished with a high degree of precision. Unless this requirement is met, the surface pressure of the interfitting portions would become locally high, and if its value exceeds a predetermined allowance, mounting portions would undergo plastic deformation and become wobbly or develop crack formation. The protrusion of the disk can be worked on relatively easily by machining because the protrusion is formed on the outer periphery of a rotary member. However, operation efficiency has been low and difficulties have been experienced in imparting precise finishes to the mounting grooves of the blades because it has been customary to use a formed end mill cutter in carrying out the necessary machining operations. The end mill cutter has the configuration of a rotary member that can be obtained by rotating a groove of the Christmas tree shape about its center line and is provided with cutting edges at its outer peripheral surface. When this cutter is rotated to form a groove by machining, it has been impossible to obtain optimum machining speeds at all the portions of the groove because the machining speeds vary from a portion of the cutter of large diameter to a portion thereof of small diameter.

When the mounting groove of the blade is formed by machining, the cutter is moved in an arcuate form in the direction of the groove while being rotated as it passes through the groove. Thus, it is necessary to perform a machining operation in opposite directions at left and right portions of the cutter or upwardly and downwardly. This makes the reaction of the machine oriented in opposite directions, so tha vibration tends to be produced and it is difficult to give precise finishes to the groove with a high degree of precision.

Moreover, in a formed end mill cutter, cuts are constant in amount in a machining operation in spite of a variation in the machining speed. Thus, this cutter suffers the disadvantage that a large machining reaction acts on a minimum diameter portion of the cutter and causes rupture to occur therein.

SUMMARY OF THE INVENTION

One object of this invention is to provide an apparatus for working on mounting grooves of turbine blades, with the apparatus being capable of highly efficiently machining mounting grooves in the turbine blades, which grooves are finished with a high degree of precision.

Another object of the invention is to provide an apparatus for working of mounting grooves for turbine blades capable of keeping, when a groove is formed by machining, machining speeds for cutting various portion of the groove substantially at a constant level.

In accordance with the invention rotatable a disk-shaped member has, at an outer peripheral portion thereof, a plurality of cutters each in the form of a mounting groove of a turbine blade which, ranging from a cutter for giving coarse finishes to a cutter for giving fine finishes, are arranged equidistantly from one another peripherally of the disk-shaped member, so that it is possible to form in a mounting groove portion of a turbine blade, a mounting groove of the predetermined shape and configuration as the disk-shaped member is rotated through a predetermined angle to cause the cutters from the cutter for giving coarse finishes to the cutter for giving fine finishes to pass successively through the mounting groove.

DETAILED DESCRIPTION

Figure 1:
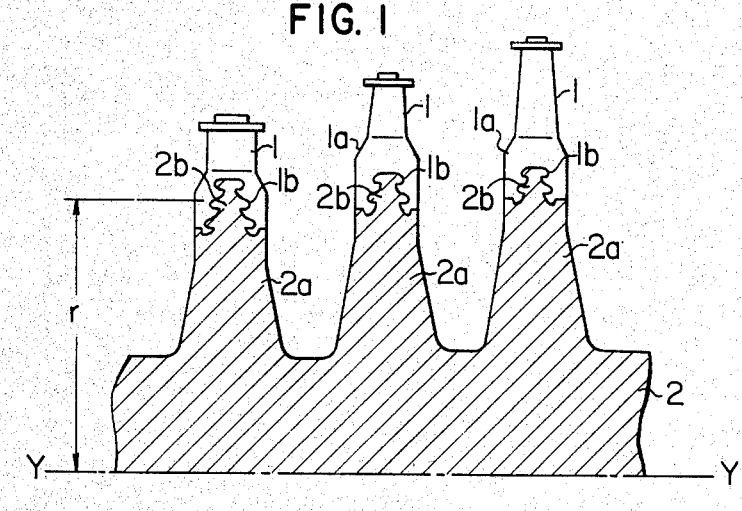
FIG. 1 is a sectional view of the turbine blades of the radial entry type, showing the manner in which the blades are fitted to the disks of the turbine rotor shaft.

Referring now to the drawings wherein like reference numerals are used throughout the various views to designate like parts and, more particularly, to FIG. 1, according to this figure, turbine blades 1 are mounted on disks 2a formed integrally with a turbine rotor shaft 2, with the disks 2a each being formed at the outer periphery with a protrusion 2b in the form of a Christmas tree in cross section. The turbine blades 1 are each formed at a base 1a thereof with a mounting groove 1b of a cross-sectional shape corresponding to the cross-sectional shape of the protrusion 2b. The turbine blades 1 which are exposed to high temperature atmosphere during operation develop centrifugal forces of high magnitude due to high speed rotation. Therefore, unless the mounting groove 1b of the blade 1 and the protrusion 2b of the disk 2a are finished with a high degree of precision, surface pressure on the protrusion 2b and the groove 1b might exceed a predetermined allowance in some portion and plastic deformation might locally occur, thereby causing a serious accident. Thus, precise finishes should be given to the groove 1b and the protrusion 2b. Since the protrusion 2b is formed at the outer periphery of the disk 2a, it is possible to relatively easily obtain high precision finishes as by means of a lathe. However, since the mounting groove 1b of the blade 1 has been worked by using a formed end mill cutter, the problem described hereinafter arises.

It is necessary that the mounting groove 1b of the turbine blade 1 satisfy the following technical conditions, and this requires high level techniques for carrying out a machining of the mounting groove.

Figure 2:
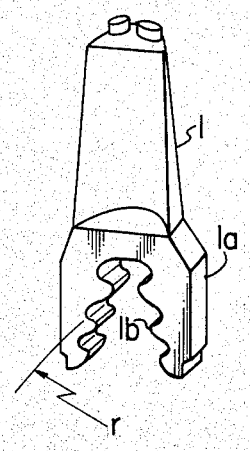
FIG. 2 is a perspective view of one of the turbine blades shown in FIG. 1.

More specifically, as shown in FIG. 2, surfaces of the groove 1b located thicknesswise of the blade, are arcuate in shape and the radius r of the arcuate surfaces of projections, extending into the groove (only one of the arcuate surfaces is shown), should correspond with the distance r between the center line Y—Y of the turbine rotor shaft 2 and the particular arcuate surface, because the outer peripheral surface of the protrusion 2b of each disk 2a of the rotor shaft 2 is formed as a surface of rotation centered at the center line Y—Y of the rotor shaft 2. Thus, if it is to be fitted to the outer peripheral surface of the protrusion 2b with a high degree of precision, the groove 1b of the blade 1 should also have surface of rotation.

Figure 3:
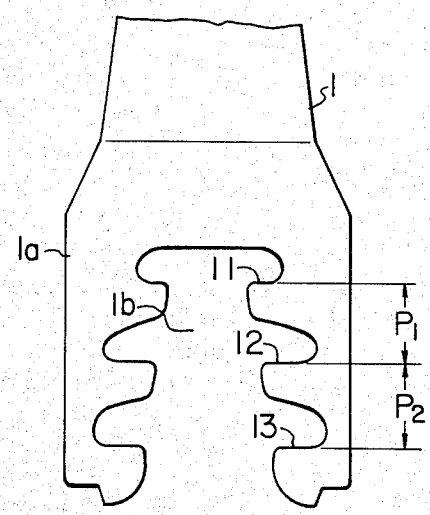
FIG. 3 is a view showing the mounting groove of a turbine blade in detail.

Moreover, as shown in FIG. 3, the projections extending transversely inwardly from side walls of the groove 1b have pitches $P_1$ and $P_2$ which must agree precisely with the pitches of the corresponding portions of the protrusion 2b of the disk 2a. When the mounting groove 1b of the blade shown in FIG. 3 is fitted over the protrusion 2b of the disk 2a of the rotor shift 2, surfaces 11, 12 and 13 of the projections have acting thereon centrifugal forces developing in the blade 1, so that the surfaces 11, 12 and 13 of the projections of the groove 1b should be in intitimate contact with the corresponding surfaces of the protrusion 2b of the disk 2a. Stated differently, the mounting groove 1b of the turbine blade 1 should be finished such that the pitches $P_1$ and $P_2$ of the surfaces 11, 12 and 13 of the projections accurately have the predetermined values.

To meet the aforesaid requirements, the apparatus for working on the mounting grooves of the turbine blades as shon in FIGS. 4–8 has been developed.

Figure 4:
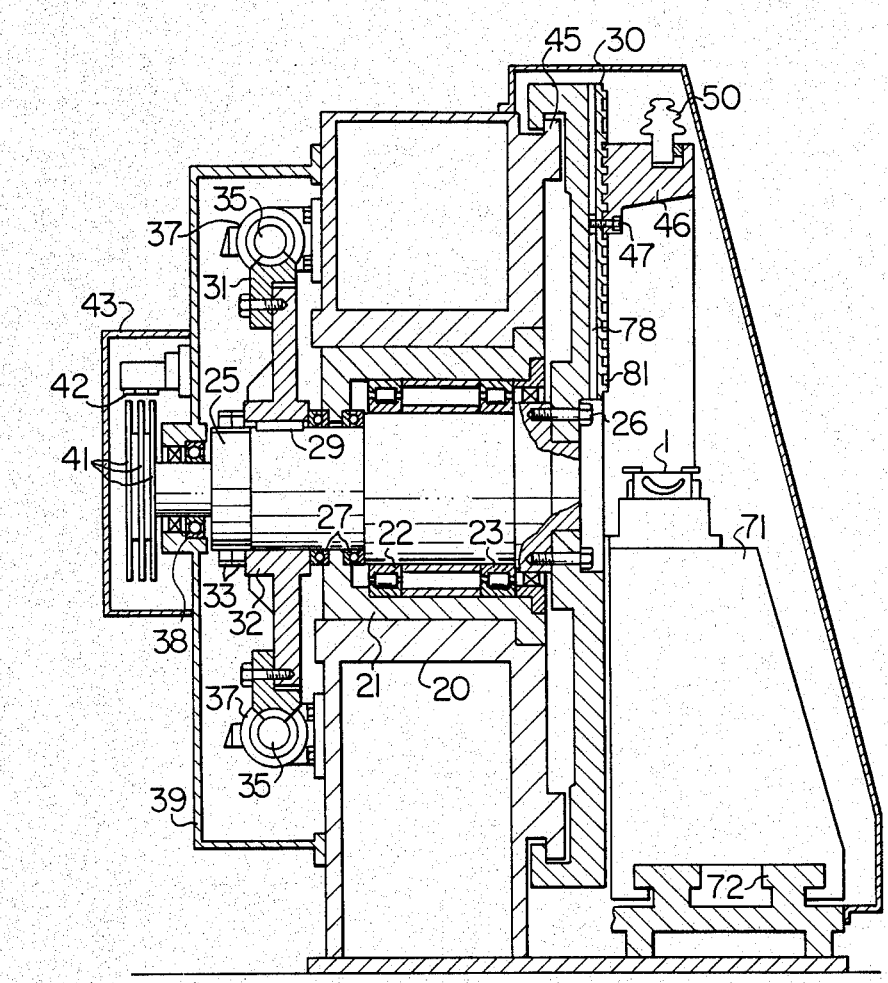
FIG. 4 is a sectional view of one embodiment of the apparatus for working on mounting grooves of turbine blades according to the invention.

More particularly, as shown in FIG. 4, the working apparatus of the invention is supported at a main spindle 25 by a main body 20 through a bearing sleeve 21 and roller bearing 22 and 23. A rotary disk 30 is secured by bolts 26 to a forward end of the main spindle 25.

The main spindle 25 has thrust bearings 27 mounted therein for bearing a thrust load applied thereto, and a worm wheel 31 is mounted on the main spindle 25 through a key 29 in a position disposed rearwardly of the thrust bearings 27. The work wheel 31 includes a center hub 32 secured to a main spindle 25 by lock nuts 33. Meshing with the workpiece wheel 31 is a work 35 which is connected to an electric motor 37 through an output shaft of the latter. The main spindle 25 is held at its rear end through a bearing 38 by a rear cover 39, and an angle sensing disk 41 for sensing the angle of rotation of the main spindle 25 and a limit switch 42 located in juxtaposed relation to the 41 are mounted rearwardly of the rear cover 39. The disk 41 and limit switch 42 constitute an angle sensing section which is enclosed by a cover 43 to avoid misoperation of the limit switch 42.

The rotary disk 30 is fitted over guide projections 45 formed integrally with the main body 20 to minimize wobbling of the disk 30 at the surface of rotation when it is driven by the main spindle 25 for rotation. An arcuate holder 46 is secured to the front surface of the disk 30 by bolts 47 and has a plurality (seven in the embodiment shown) of cutters 50 mounted on its outer peripheral surface. The holder 46 is divided into five blocks, such blocks being mounted in an arcuate form on the surface of the disk 30 (in FIG. 5, only two blocks on the opposite ends are shown, with intermediate three blocks being shown in dash-and-dot lines).

Figure 5:
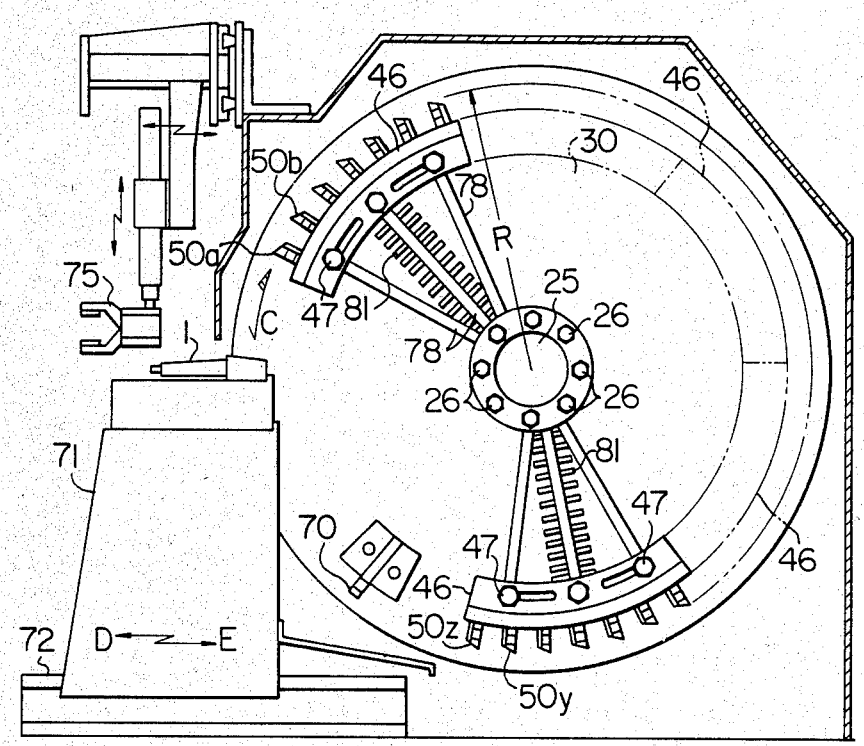
FIG. 5 is a front view of the apparatus for working on mounting grooves of turbine blades shown in FIG. 4.

The rotary disk 30 rotates in the direction of an arrow C in FIG. 5. When the disk 30 rotates, a cutter 50a is the leading cutter and a cutter 50z is the trailing cutter. Thus, cutters 50 are arranged such that coarse finishes, meddle finishes and fine finishes are successively given to the mounting groove of the blade by the cutters 50a to 50z, as the disk 30 rotates.

As shown in FIG. 5, a tester 70 for checking the degree of finish given to the mounting groove 1b is located rearwardly of the final finish cutter 50z. A workpiece or a turbine blade 1 is secured to a saddle 71 which moves along rails 72. The turbine blade 1, secured to the saddle 71, is substantially at the same elevation as the center of the main spindle 25 so that as the saddle 71 moves in a closing movement in the direction of arrows D-E, the position of the groove 1b can be adjusted with respect to the path of movement of the cutters. An automatic mounting and removing device 75 is provided for mounting the workpiece or the turbine blade 1 on the saddle 71 or removing the same therefrom.

Figure 6:
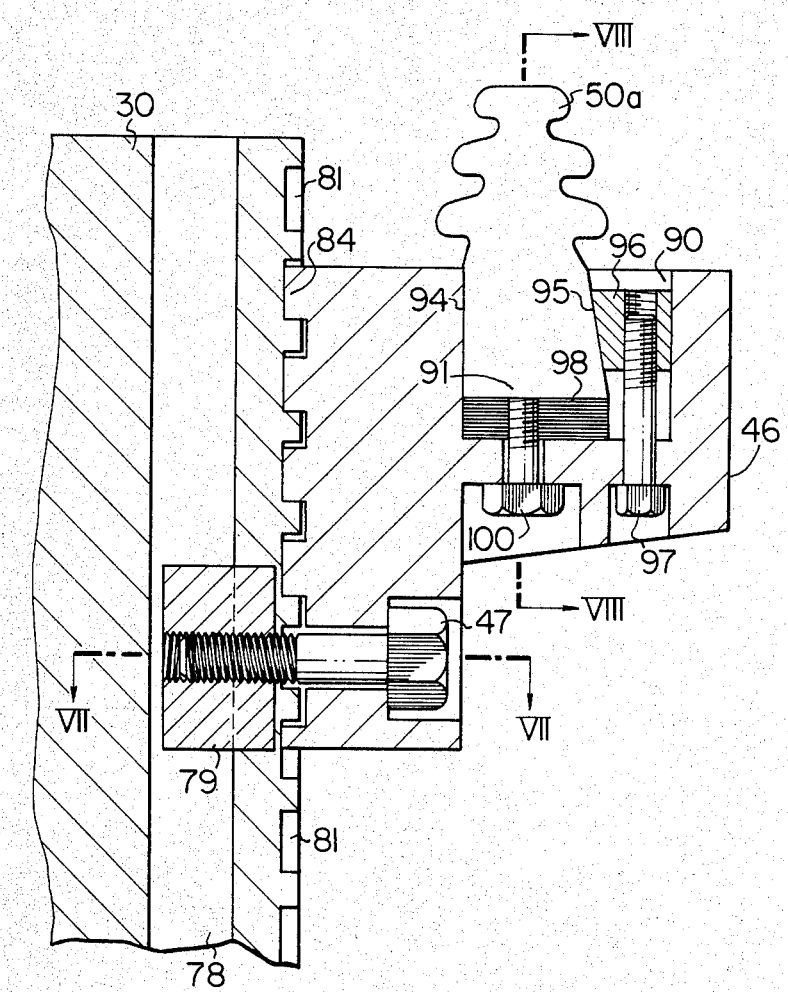
FIG. 6 is a view showing in detail the cutter support portion of the apparatus shown in FIGS. 4 and 5.
Figure 7:
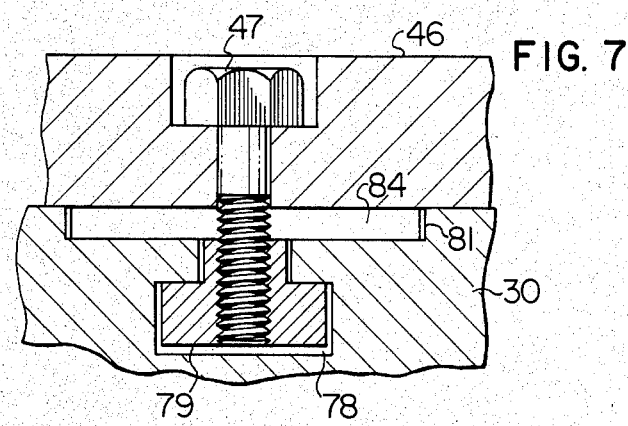
FIG. 7 is a sectional view taken along the line VII—VII in FIG. 6.

FIGS. 6 and 7 show in detail a structure for attatching the holder 46 to the rotary disk 30. More particularly, clearly shown in FIG. 7, the disk 30 is formed with grooves 78 of a T-shaped cross section extending radially from its center to its outer circumferential surface, and a nut 79 of the T-shape is slidably held in each of the grooves 78. The disk 30 is formed on its surface with recesses 81 located at predetermined intervals at right angles to the center grooves 78 of each block of holder 46, and projections 84 are formed at the holder 46 in positions corresponding to those of the recesses 81. The holder 46 is secured in place, as shown, by tightening the bolts 47 after the projections 84 are received in the recesses 81.

Figure 8:
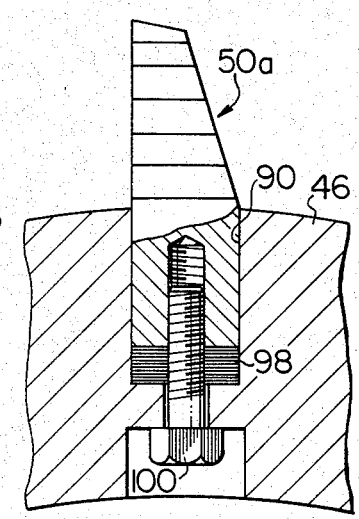
FIG. 8 is a sectional view taken along the line VIII—VIII in FIG. 6.

A structure for securing the cutters 50a ... 50z to the holder 46 will be described by referring to FIGS. 5-8. The holder 46 is formed at its outer peripheral surface with holes 90 arranged peripherally with a predetermined spacing interval therebetween each for receiving a base 91 of the cutter 50 fitted therein. Each hole 90 is formed such that its dimension thicknesswise of the cutter corresponds to the dimension of the thickness of the cutter 50a, so that when a cutter is forced into the hole 90 as shown in FIG. 8, no gap exists in the direction of thickness. Positioning of the cutter is effected by using, as a reference, a lateral surface 94 of the hole 90 on the side of the disk 30, and the surface of the cutter 50a on a side thereof opposite the lateral surface 94 tapers as indicated at 95. A block 96 having a tapering surface corresponding to the tapering surface 95 is forced into the hole 90 from below by means of a bolt 97 so as to press the cutter leftwardly while avoiding dislodging of the cutter 50a upwardly from the hole 90.

Vertical positioning of the cutter is effected by placing a plurality of thin spacers 98 below the base 91 of the cutter 50a and vertically moving the cutter 50a in the hole 90 from below by means of a bolt 100.

Figure 9:
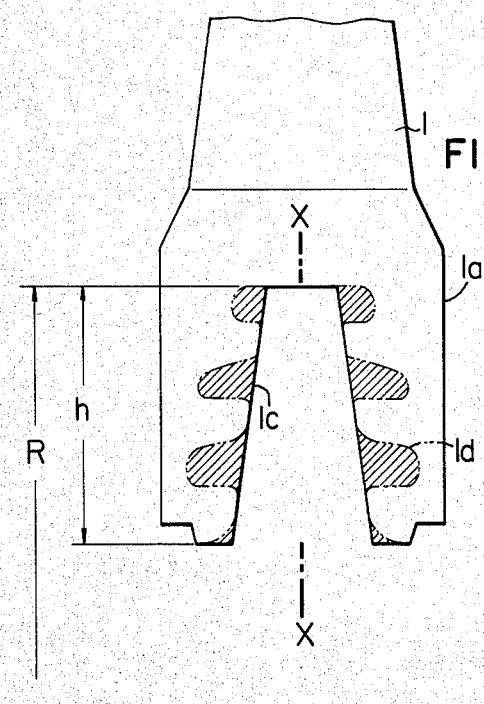
FIG. 9 is a view showing a mounting groove portion of a turbine blade before being worked on by the apparatus shown in FIGS. 4 and 5.

FIG. 9 shows a turbine blade 1 having a mounting groove to which a coarse finish has been given beforehand. A groove 1c of trapezoidal configuration is provided at the base 1a of the blade 1 as by a milling machine. The blade 1 that has had coarse finish given thereto is set in a predetermined position on the saddle 71 and a start button is depresssed. Then the motor 37 is actuated to rotate the disk 30 in the direction of the arrow C in FIG. 5 through the worm 35, worm wheel 31 and main spindle 25. Rotation of the disk 30 allows the cutters 50a . . . 50z to move successively through the mounting groove of the blade 1 to machine the blade 1 to cut the groove until the groove has its configuration changed from 1c shown in solid lines in FIG. 9 to a final configuration 1d shown in dash-and-dot lines. The cutters 50a . . . 50z are constructed such that their sizes successively grow larger so that the leading cutter 50a is substantially similar to the configuration 1c of coarse finishes and the trailing cutter 50z corresponds to the configuration 1d of final fine finish. The cutters are also configured such that the areas of the groove cut by different cutters are substantially equal to one another. More specifically, the hatched portions of the blade 1 are those removed therefrom by the cutters 50a . . . 50z, and the difference in area between the configurations cut by the preceding cutter and the following cutter is substantially equal to the area obtained by dividing the hatched portions by the number of the blades. The cutters simultaneously cut portions of the groove of the blade 1 which are symmetrical with respect to the center line X—X of the groove.

The portion of the rotary disk 30 at which the cutters 50a are mounted thereon has a peripheral velocity equal to the blade groove cutting velocity, so that the speed of the rotary disk 30 is adjusted in such a manner that the cutting speed is optimized in accordance with the materials of the blade and the cutters. When the groove is cut, the difference in peripheral velocity between an upper end and a lower end of the groove causes a variation to occur in cutting speed. However, since the groove has a vertical dimension h which is less than 1/10 the distance R from the tip of the cutter to the center of the disk, the cutting speed at every portion of the groove can be brought substantially into agreement with the optimum cutting speed.

After the final finishing cutter 50z has moved through the groove of the blade 1 to give finishing touches to the groove during rotation of the disk 30, the tester 70 for measuring the dimension of the groove moves through the groove that has had finishing touches given thereto, to check whether or not the groove has a predetermined value. When the disk 30 has made one complete revolution, the angle sensing disk 41 and the limit switch 42 at the rear end of the main spindle 25 are actuated to render the motor 37 inoperative. The series of operations described hereinabove finishes on the mounting groove of one blade 1, and the automatic mounting and removing device 75 is actuated to remove from the saddle 71 the blade 1 that has been worked on and mount another blade to be worked on in a predetermined position on the saddle 71.

In the working apparatus of the invention, the precision with which the mounting groove is cut in a blade may vary depending on the gap between the main spindle 25 and the bearings 22 and 23 journalling same, wobbling of the surface of the rotary disk 30, the precision with which the cutters are configured, and the precision with which the cutters are arranged on the holder 46. Thus, the needle bearings 22 and 23 and thrust bearings 27 of high precision finishes are used for journalling the main spindle 25, and the guides 45 support the rotary disk 30 in the vicinity of its outer periphery to minimize wobbling of the surface thereof. The cutters are configured with a high degree of precision and secured to the holder 46 by using as a reference surface the left lateral surface 97 (see FIG. 6) of the hole 90 which is precisely finished. The configuration of the cutter and dimensions of various parts thereof are finished by using as a reference a left lateral surface thereof located in a vertical plane which is brought into contact with the left lateral surface 94 of the hole 90.

The rotor disks 2a for mounting turbine blades 1 thereon differ from the high pressure stage to the low pressure stage in the height of the outer peripheral surface as shown in FIG. 1. Thus, it is necessary to vary the radius R of the forward end portion of the cutters 50a . . . 50z to conform to the height of the outer peripheral surface of the respective rotor disks 2a (FIG. 9). To this end, the holder securing bolts 47 are loosened to allow the holder 46 to move radially of the disk 30 to effect adjustments of the radius R. As the holder 46 moves as aforesaid, the bolts 100 and 97 are moved to effect adjustments of the cutter 50 to bring the forward ends thereof into positions on the same circumferential surface. When the outer peripheral surfaces of the disks 2b vary greatly from each other in height, it is necessary to replace the holder 46 by a new one of suitable radius of curvature. It would be convenient to have on hand a plurality of holders 46 of different radii of curvature. As the radii R of the forward end portions of the cutters 50 are varied, the position of the saddles is adjusted by moving same in the directions D-E in FIG. 5. The holder 46 has been described as being divided into five blocks by referring to FIG. 5. The invention is not limited to this specific form of the holder 46, and the holder 46 may be in the form of a ring cut out in one portion. In this case, a plurality of holders 46 of different radii should be made available.

The greater the number of cutters 50, the smaller is the volume of the material of the blade 1 that is removed by machining, with a result that the precision with which the mounting groove 1b is finished can be increased. However, the dimensions of the cutters 50 place limitations on the number of cutters that can be secured to the holder 46. Usually the number of the cutters 50 is between 30 and 40.

From the foregoing description, it will be appreciated that the apparatus for working on mounting grooves formed at bases of turbine blades according to the invention comprises a plurality of cutters supported on a rotary disk and arranged such that cutters for giving coarse finishes, cutters for giving middle finishes and cutters for giving fine finishes are successively located in the indicated order on the outer circumferential surface of the rotary disk, with such cutters being movable through a groove formed beforehand at the base of a turbine blade as the rotary disk rotates, so that a mounting groove given with fine finishing touches can be provided by machining. The cutting speed is made substantially constant at all portions of the groove and cutting conditions can be optimized, and the smoothness of the finished surface and the precision with which the surfaces are finished can be greatly improved.

In the invention, the groove is continuously cut by a plurality of cutters. Thus, the mean machining allowance allotted to each cutter is very small because it is several times as small as the value obtained by dividing the total machining allowance by the number of the cutters. Thus, the risk that formed cutters might be broken while in service can be eliminated, even if they are of a configuration conforming to that of the groove to be formed by machining.

What is claimed is:

1. An apparatus for working on mounting grooves formed at a base of turbine blades of a radial entry type for mounting the turbine blades on rotor disks, the apparatus comprising:

rotary drive means;

a rotary disk driven by said rotary drive means for rotation substantially in a vertical plane;

a plurality of cutters supported on said rotary disk, said plurality of cutters being located in positions forming an arc on said rotary disk in such a manner that cutters for giving coarse finishes, cutters for giving middle finishes, and cutters for giving final fine finishes are arranged successively in the indicated order in the direction of rotation of said rotary disk, said plurality of cutters are mounted on said rotary disk through a cutter holder;

said rotary disk is formed with a plurality of T-shaped slots for guiding said cutter holder in its movement radially of the rotary disk, and a plurality of racks for positioning said cutter holder radially of said rotor disk;

blade holding means for supporting a tubine blade in such a manner that a groove of coarse finishes formed beforehand at the base of said turbine blade is located in a position through which said plurality of cutters move as said rotary disk is rotated;

wherein a rotation of said rotary disk causes said cutters to move through the groove of said turbine blade to be machined, to give fine finishes to the mounting groove of said turbine blade; and said cutter holder is mounted on an end face of said rotary disk, said cutters are mounted on said cutter holder such that said cutters extend radially outwardly from an outer peripheral surface of said cutter holder and are fixed so as to be maintained substantially equidistantly spaced from each other, and a distance from a center of rotation of said rotary disk to said cutters is adjustable so as to conform with a diameter of the rotor disk on which the turbine blades to be machined are to be mounted.

2. An apparatus for working on mounting grooves formed at bases of turbine blades as claimed in claim 1, wherein said cutter holder is provided with shims used for adjustably supporting said cutters, whereby the cutters can be supported in a manner to have their positions adjusted radially of the rotary disk.

* * * * *